United States Patent [19]
Snyder

[11] Patent Number: 4,699,854
[45] Date of Patent: Oct. 13, 1987

[54] MULTI-OPTION DEFERRED ACTION BATTERY

[75] Inventor: Gilbert R. Snyder, Scottsdale, Ariz.

[73] Assignee: Motorola, Inc., Schaumburg, Ill.

[21] Appl. No.: 875,908

[22] Filed: Jun. 19, 1986

[51] Int. Cl.4 ............................................. H01M 6/36
[52] U.S. Cl. ..................................... 429/114; 429/115
[58] Field of Search ................................ 429/114, 115

[56] References Cited

U.S. PATENT DOCUMENTS

| | | | |
|---|---|---|---|
| 2,403,567 | 7/1946 | Wales | 429/114 |
| 3,298,868 | 1/1967 | Smith et al. | 429/115 |
| 3,460,993 | 8/1969 | Saunders et al. | 429/115 X |
| 3,514,339 | 5/1970 | Powers | 429/115 |
| 4,218,325 | 8/1980 | Selgin | 429/114 |
| 4,375,504 | 1/1983 | Jensen et al. | 429/115 |

Primary Examiner—Brian E. Hearn
Assistant Examiner—Stephen J. Kalafut
Attorney, Agent, or Firm—Eugene A. Parsons

[57] ABSTRACT

A multi-option deferred action battery which consists of an electrolyte filled ampule which can be broken to activate the battery. This activation can occur with or without external forces such as spin or set-back.

8 Claims, 1 Drawing Figure

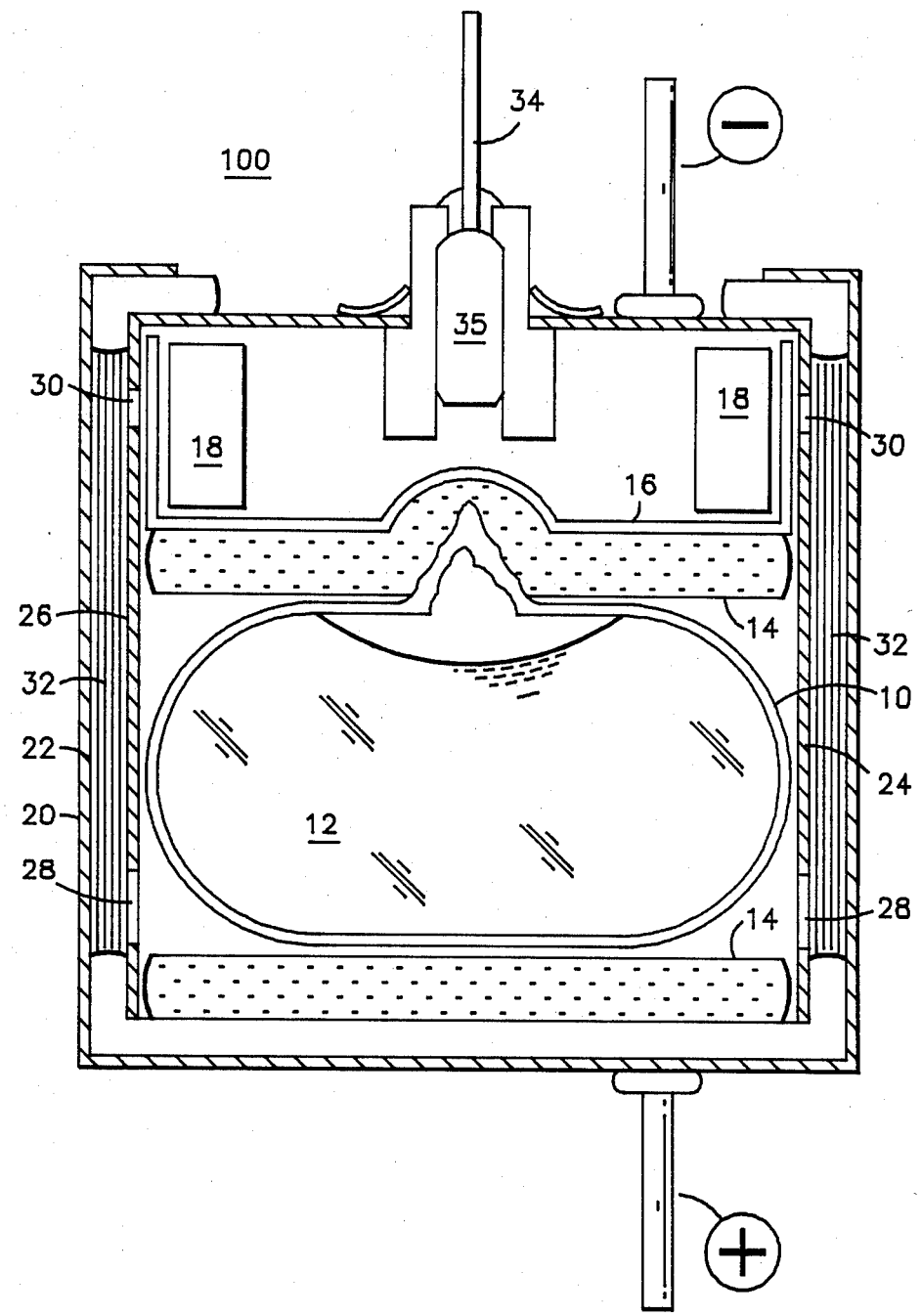

MULTI-OPTION DEFERRED ACTION BATTERY

BACKGROUND OF THE INVENTION

The present invention pertains to electrochemical batteries, and more specifically, to deferred action batteries. Deferred action batteries are well-known in the art and are used when it is necessary to have a battery with a long shelf life or when activation of the cell is desired only immediately prior to use. These deferred action batteries have been used extensively in military devices which depend on electrochemical battery power to operate, but where safety and reliability of the battery requires that the battery not activate until needed. A typical prior art deferred action battery is disclosed in U.S. Pat. No. 3,754,996, entitled "Ductile Ampule Deferred Action Battery", issued Aug. 28, 1973. The deferred action battery disclosed in this patent is relatively complicated, expensive to produce, and requires spin and set-back forces to activate.

SUMMARY OF THE INVENTION

This invention pertains to a multi-option deferred action electrochemical battery including a breakable ampule which is surrounded by a shock absorbing material in order to prevent undesired activation of the cell. A weighted piston is placed on top of the shock absorbing material so that when a predetermined force is exerted the weighted piston breaks the ampule and activates the battery. This force can be applied by setback, an electro-explosive primer or any other force producing action or device. This entire mechanism is enclosed by two containers whereas one container is smaller than the other container creating a space between the two containers which is filled with a bibulous substance. The inside container is constructed so that the outside surface creates an anode and entry holes on the bottom and vents on the top of the container are made. The outer container is constructed so that its inside surface creates a cathode and is completely enclosed.

In a specific embodiment the multi-option deferred action battery includes a glass ampule, closed cell silicon rubber for shock absorption, a lead plated inside container, a lead dioxide plated outside container and a flouroboric acid electrolyte.

It is an object of the present invention to provide a new and improved deferred action battery which is simpler to manufacture and less expensive.

It is a further object of the present invention to provide a new and improved deferred action battery which can be activated with or without spin or set-back forces.

These and other objects of the invention will become apparent to those skilled in the art upon consideration of the accompanying specification, claims, and drawing.

BRIEF DESCRIPTION OF THE DRAWING

The figure is a cross-sectional view of a multi-option deferred action battery embodying the present invention.

DESCRIPTION OF THE PREFERRED EMBODIMENT

Referring to the figure, a multi-option deferred action battery, generally designated 100, is illustrated. Battery 100 contains a breakable ampule 10 encasing an electrolyte 12. Electrolyte 12 may be any material which reacts favorably with an anode and a cathode (to be explained below), for example flouroboric acid. Ampule 10 can be made from such materials as glass, breakable plastics, etc.

Protecting the ampule from breaking before desired is a shock absorbing material 14. Shock absorbing material 14 which can be made of closed cell sponge rubber and the like is placed on the top and bottom of ampule 10. On top of material 14 rests a piston 16 which has resting on it weights 18.

An outer housing of battery 100 is formed by a container 20. The container 20 is constructed to form a cathode 22, as, for example, by electroplating the inner surface with lead dioxide. An inner housing of battery 100 is formed by a container 24. The container 24 is constructed to form anode 26 as, for example, by electroplating the outer surface with lead. Entry holes 28 and vents 30 are formed by incontinuities in the surface of container 24.

A bibulous substance 32 occupies the area between cathode 22 and anode 24 and an electro-explosive primer 34 is installed in the area between container 24 and piston 16 in order to allow for activation of battery 100 prior to such external forces as spin or set-back. Primer 34 can be triggered by a piezoelectric device, a power source, etc.

An optional gas emitting substance 35 is placed around primer 34, which will exert additional pressure down on piston 16 when primer 34 is triggered.

In the preferred embodiment of the figure, pressure exerted on piston 16 either by set-back forces or by the pressure exerted by primer 34 will cause ampule 10 to break and the additional force of weights 18 will move piston 16 downward thereby forcing the released electrolyte 12 through entry holes 28 where the bibulous substance 32 will help soak up electrolyte 12. Vents 30 relase excess air pressure. Battery 100 is now ready for use. It should be obvious to one skilled in the art the heaviness of weights 18 will vary depending on how much force is desired for the battery to activate. In order to activate the battery upon a slight force, weights 18 should be heavy. However, if safety is a strict requirement and activation is not desired until a large force is exerted on piston 16, no weights may be necessary at all or they will be very light.

Ampule 10 can be broken with either set-back forces or by primer 34. No spin forces are required to distribute electrolyte 12 between cathode 22 and anode 26 in order to activate battery 100. Therefore, battery 100 is a simple and inexpensive deferred action battery which is useful whether or not spin or set-back forces are present.

While a specific embodiment of this invention has been shown and described, obvious modifications and improvements will occur to those skilled in the art. I desire it to be understood, therefore, that this invention is not limited to the particular form shown and I intend in the amended claims to cover all modifications which do not depart from the spirit and scope of this invention.

What is claimed is:

1. A multi-option deferred action battery comprising a breakable ampule containing an electrolyte therein, an anode and a cathode, a shock absorbing material positioned adjacent said ampule to prevent inadvertent breaking of said ampule, internal activation means and means responsive to external setback forces positioned for breaking said ampule and for applying an internal force in order to move the electrolyte into contact with said anode and said cathode to activate the battery.

2. A multi-option deferred action battery as claimed in claim 1 wherein said activating means is a weighted piston.

3. A multi-option deferred action battery as claimed in claim 1 wherein an electro-explosive primer is installed in the battery capable of applying an internal force to move the electrolyte into contact with said anode and said cathode to activate the battery.

4. A multi-option deferred action battery as claimed in claim 3 wherein said primer is surrounded by a substance which emits gas when the primer is triggered.

5. A multi-option deferred action battery comprising:
a first container;
a second container positioned so as to be encased by said first container;
material at least on the inside surface of the first container creating a cathode and material at least on the outside surface of the second container creating an anode;
a breakable sealed ampule containing an electrolyte therein, shock absorbing members adjacent to the outside of said breakable sealed ampule, a piston connected to at least one of said shock absorbing members, and weights attached to the said piston, with said ampule, said shock absorbing members, siad piston and said weights located on the inside of said second container;
an electro-explosive primer installed in said second container capable of actuating the battery without forces external to the battery;
a bibulous substance positioned between the inside of said first container and the outside of said second container; and
entry holes and vents defined by incontinuities on the surface of the second container.

6. A multi-option deferred action battery as claimed in claim 5 wherein said primer is surrounded by a substance which emits gas when the primer is triggered.

7. A multi-option deferred action battery comprising:
a first container;
a second container positioned so as to be encased by said first container;
material at least on the inside surface of the first container creating a cathode and material at least on the outside surface of the second container creating an anode;
a sealed glass ampule containing a liquid electrolyte therein, closed cell sponge rubber adjacent to the top and bottom of said sealed glass ampule, a piston connected to said top closed cell sponge rubber, and weights attached to the said piston, with said glass ampule, said sponge rubber, said piston and said weights located on the inside of said second container;
an electro-explosive primer installed in said second container capable of actuating the battery without forces external to the battery;
a bibulous substance positioned between the inside of said first container and the outside of said second container; and
entry holes and vents defined by incontinuities on the surface of the second container whereby when the said piston is forced downward into its activation postion said glass ampule is broken, said electrolyte is sent through said entry holes by the force exerted by said piston and the sucking force of said bibulous substance, and excess air pressure is released through said vents.

8. A multi-option deferred action battery as claimed in claim 7 wherein said primer is surrounded by a substance which emits gas when the primer is triggered.

* * * * *